No. 648,668. Patented May 1, 1900.
T. S. KREIDER.
DEVICE FOR DRAINING SALTED MEATS, &c.
(Application filed Apr. 26, 1899.)
(No Model.)

Witnesses
C. Bradway.
Harry L. Mauck

Inventor
Tobias S. Kreider.
By Thos. S. Watson.
Attorney

UNITED STATES PATENT OFFICE.

TOBIAS S. KREIDER, OF BIRD IN HAND, PENNSYLVANIA.

DEVICE FOR DRAINING SALTED MEATS, &c.

SPECIFICATION forming part of Letters Patent No. 648,668, dated May 1, 1900.

Application filed April 26, 1899. Serial No. 714,584. (No model.)

*To all whom it may concern:*

Be it known that I, TOBIAS S. KREIDER, a citizen of the United States, residing at Bird in Hand, in the county of Lancaster and State of Pennsylvania, have invented certain new and useful Improvements in Devices for Draining Salted Meats, &c.; and I do hereby declare the following to be a full, clear, and exact description of the invention, such as will enable others skilled in the art to which it appertains to make and use the same.

My invention relates to a household article to be used in the culinary department. It is a device used for the purpose of draining pickled or salted meats, such as fish; and it consists of a drain-pan in which is removably adjusted a plank or board upon which the salted article is placed for draining.

The object of my invention is to produce a device of this character which, embodying certain improvements, is simple and practical in construction and at the same time admits of being cheaply manufactured.

The device is compact in appearance and can be readily taken apart for cleaning or other purposes.

My invention consists of certain novel features of construction and combination of parts, with their objects, as will be hereinafter more fully described, and specified in the claim subjoined hereto as part of this specification, reference being had to the accompanying drawings.

Figure 1:
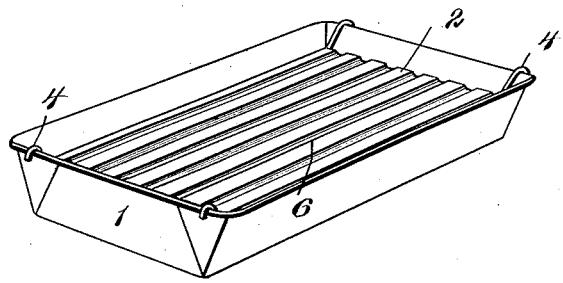
Figure 2:
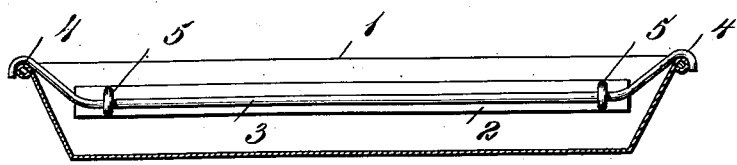
Figure 3:
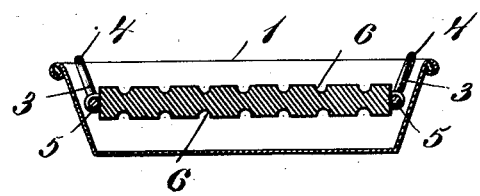

Figure 1 is a perspective view of my invention. Fig. 2 is a longitudinal sectional view through the pan or tray, showing the draining-board in elevation. Fig. 3 is a transverse section through the device.

In referring to the drawings similar numerals designate similar parts in the several views.

The numeral 1 designates the pan or tray, which is in construction similar to an ordinary culinary pan and which is adapted to receive water.

2 designates the board or plank upon which the salted article is placed. This board 2 is removably adjusted in the pan 1 by means of the side rods 3, which extend longitudinally along the edge of the board. The rods 3 near their ends assume an upward bend and terminate in hooks 4, adapted to engage the edge of the pan. By the eye-fastenings 5 the rods are secured to the edge of the board, but in such a manner that will admit of pivotal movement of the rods. The object of the pivotal movement of the rods is to permit the board to be used on either side when desired.

On the two flat faces of the board there is provided a plurality of grooves, as designated in the drawings by the numeral 6. These may be arranged on each face with relation to each other directly opposite, alternately opposite, or one face may be provided with a greater number of grooves than the other, so as to suit the nature of the salted article to be placed thereon.

When using the device as above described, the board or plank is first removed and a sufficient quantity of water is poured in the pan so that when the board is replaced the under face thereof is immersed in the water, while the upper face remains dry. The water used is preferably hot, so that the heat ascending courses under the salted article on the board and through the grooves, thereby effectuating the draining of the article. The water being in contact with the board, the liquor from the article draining through the grooves is immediately absorbed, and thus prevents the emission of objectionable odors.

I desire to have it understood that I may make such changes as do not contravene the spirit of the invention.

Having thus described my invention, what I claim as new, and desire to secure by Letters Patent, is—

In a device for draining salted articles, the combination of a receptacle or pan, a board having a plurality of grooves on its upper and lower surfaces, eyes on the longitudinal edges of the board and supporting-rods loosely secured in the eyes, so that by turning the rods in the eyes they will support the board in a reversed position, substantially as described.

TOBIAS S. KREIDER.

Witnesses:
CHAS. R. KLINE,
HARVEY B. LUTZ.